Nov. 25, 1958 A. J. BUCHI 2,861,774
INLET CONTROL FOR RADIAL FLOW TURBINES
Filed Feb. 13, 1951 8 Sheets-Sheet 1

Inventor
A. J. Buchi
By
Wenderoth, Lind & Ponack
Att'ys

Nov. 25, 1958     A. J. BUCHI     2,861,774
INLET CONTROL FOR RADIAL FLOW TURBINES

Filed Feb. 13, 1951     8 Sheets-Sheet 5

Inventor
A. J. Buchi
By
Wenderoth, Lind & Ponack
Attys

Inventor
A. J. Buchi
By Wenderoth, Lind & Ponack
Attys

Nov. 25, 1958 — A. J. BUCHI — 2,861,774
INLET CONTROL FOR RADIAL FLOW TURBINES
Filed Feb. 13, 1951 — 8 Sheets-Sheet 7

Inventor
A. J. Buchi
By Wenderoth, Lind & Ponack
Attys

United States Patent Office 2,861,774
Patented Nov. 25, 1958

2,861,774

INLET CONTROL FOR RADIAL FLOW TURBINES

Alfred J. Buchi, Winterthur, Switzerland

Application February 13, 1951, Serial No. 210,691

Claims priority, application Switzerland
February 16, 1950

4 Claims. (Cl. 253—52)

This invention relates to internal combustion engines supercharged by exhaust gas driven blowers, and is particularly useful in engine systems operating according to the principles taught in my now expired United States Patent No. 1,895,538 dated January 31, 1933.

Prior to my present invention, it has been necessary in constructing turbines for internal combustion engines supercharged by exhaust gas driven blowers, to select a fixed gas passage area for the nozzle orifice or orifices via which the gases are directed to the turbine rotor blading as well as a fixed angle of approach of the gas stream toward the blading. This area and angle of approach may be such as to utilize efficiently the volume, pressure and temperature of the gases exhausted by the engine at, for example, full rated load, concomitantly obtaining maximum air pressure from the blower at such exhaust gas conditions, thereby to develop the greatest obtainable power output of the engine.

In addition, the fixed blading on the turbine is specially designed to transform energy in the gas to the shaft most efficiently under the gas volume, pressure and temperature conditions assumed in selecting the particular gas passage area, shape and angle of approach. Obviously, however, a turbine with such selected fixed gas passage area and angle of approach and with rotor blading thus specially designed, will not utilize most efficiently substantially lower or higher exhaust gas, volumes, pressures and temperatures which result from operation of the engine at lesser or higher loads.

While such inefficient turbine operation may be tolerated as long as the engine load is low, since the engine demands upon the turbocharger are at a minimum, this inefficiency creates a problem when large loads are suddenly applied to the engine. In such event, the idling turbocharger produces insufficient air quantity and pressure to sustain combustion for the increased amount of fuel injected to support the load. Full horsepower is not immediately developed under such conditions. After a certain time lag, the turbocharger ultimately increases speed to deliver proper air volume and pressure in relation to the fuel injected for the load applied. This increase in speed is caused by the turbocharger being activated during this lag interval by gases discharged from the engine cylinders under what, in effect, amounts to overload conditions for the period. During this interval the incomplete combustion results in undesirable smoking of the engine. While this lag does not present any problem in engines designed to operate at relatively constant loads, such as engines for ships or power stations, it has long been a source of some concern, where the engine operates at widely and rapidly varying loads, as, for example, in truck or locomotive engines.

It is a prime object of my present invention to provide a turbocharged engine system which responds more quickly to the sudden application of load increases.

It is also an object of my invention to provide a turbocharger which operates most efficiently over a selected range of engine loads.

It is a further object to provide a turbocharged engine which better adjusts its turboblower speed automatically to conform to changes in the pressure of the exhaust gases of the engine, or of the blower air pressure.

It is a further object to provide a turbocharger for such an engine system which may be manually controlled to deliver a selected air charging pressure at most any range of engine load.

It is a further object to provide a turbine, the gas inlet area, shape and direction of which may be manually or otherwise adjusted to deliver maximum power at available gas volume, temperatures, and pressures.

It is a further object to provide a turbine, the gas inlet area, shape and direction of which may be manually or otherwise adjusted to meet the demand of power required at the shaft of the turbine.

These, and other objects which will be apparent to one skilled in the art from a reading of the following description of several embodiments of my invention, are accomplished by providing, in a turbocharged engine system, turbine means having an element for varying the through flow area, shape and direction of the gas passage or passages preceding the turbine blading, thereby regulating through-flow conditions according to the available gas energy, and hence, their velocity and angle of approach at the area of their entry into the turbine blading. Any such variance of gas velocity and angle of approach at this area has an immediate effect upon the turbine and blower speed, and consequently, upon the blower air pressure delivered to the engine cylinders.

In the preferred embodiment, these means consist of a radial type turbine having a gas discharge conduit extending axially from the turbine rotor about which conduit I provide at least one sleevelike cylinder slidable axially with respect to said conduit. At the extremity of this sleevelike cylinder nearest the passages via which the gases enter the turbine blading, I further provide a series of blades or vanes which may be of different sizes and shapes and of different angular disposition. When the sleevelike cylinder is moved axially toward said gas passages, the blades or vanes are projected therein to change the through-flow inlet area of the gases, thereby increasing or decreasing also their velocity and angle of approach to the turbine blading. By this means, I may maintain any desired air volume and pressure (within the blower operating range) at the intake point of the engine cylinders. Numerous types of manual or automatic means described herein may be provided for effecting the desired positioning of the sleevelike cylinder, and hence, of the blades or vanes, in the gas passages.

Illustrative structures of the invention and the elements thereof are shown in the drawings accompanying this specification, in which drawings:

Figs. 1–5 show a turboblower constructed in accordance with my invention in which there are provided two separate gas admission ducts and control means responsive to the exhaust gas or blower air pressure of the engine system.

Figs. 6–11 show manually operable gas flow control means in a turbine having four separate admission or receiving ducts for the actuating medium.

The Figs. 12 and 13 show still another form of gas flow control device for use in a system according to my present invention.

The Figs. 19 and 20 show details of stationary guide means for the slidable inlet control device parts of similar design to those shown in the Figs. 14–18.

Figure 1:
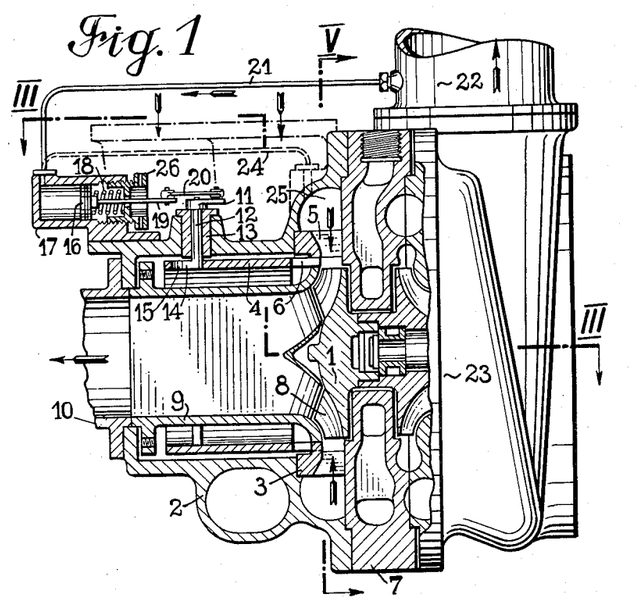
Fig. 1 is a vertical section along the line I—I of Fig. 2.
Figure 2:
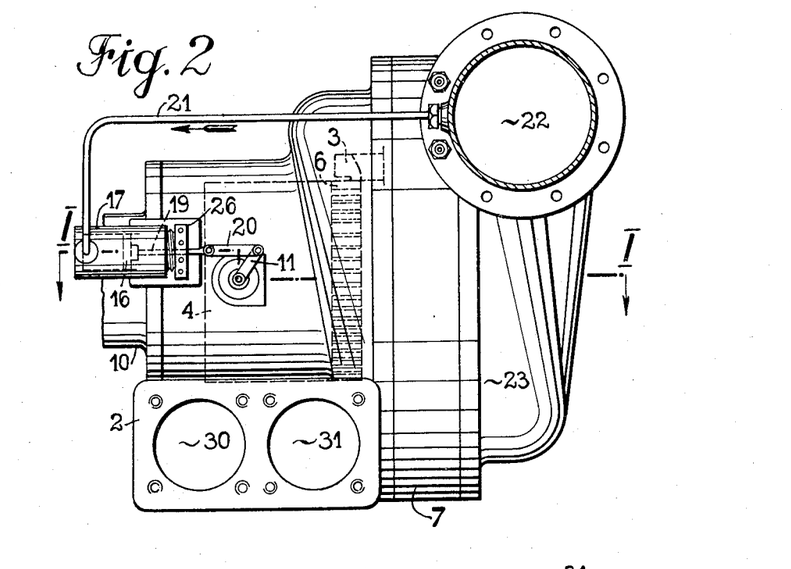
Fig. 2 is a plan view of Fig. 1.
Figure 3:
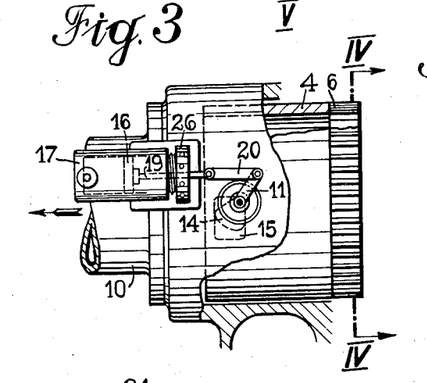
Fig. 3 is partly a plan view and partly a section along the line III—III in Fig. 1.
Figure 5:
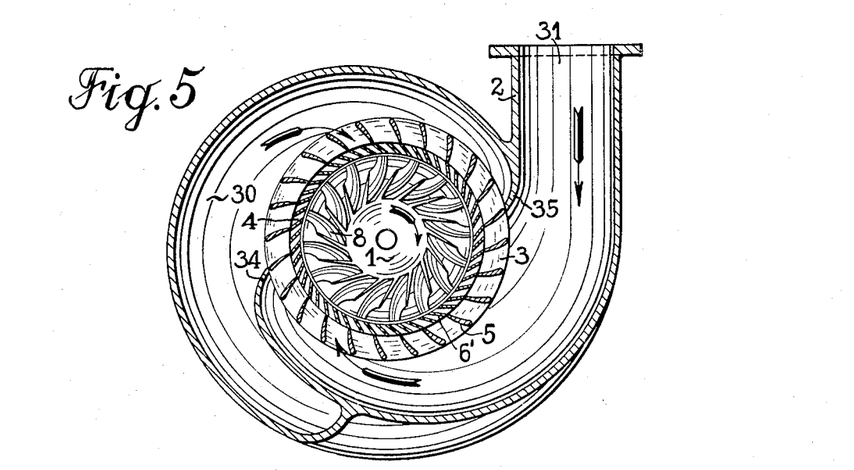
Fig. 5 is a radial section along the line V—V in Fig. 1 showing a modification in which there are twice as many inner guide vanes as outer stationary guide vanes and the inner slidable guide vanes are of equal thickness.

Referring to Figs. 1, 2 and 5, numeral 1 designates the turbine rotor of a radial flow turbine, the actuating medium for which enters the rotor blading 8 via a nozzle ring comprising blades 5 disposed radially outside of the blading 8. Numeral 2 designates that part of the turbine casing enclosing the turbine rotor and providing a passage for admitting the actuating gas thereto. Between this casing and the rotor blading 8 there is disposed an inlet control device constructed according to my present invention. This device comprises, in this embodiment, an outer part 3, which is securely built into the casing of the turbine, and a sleevelike part 4 which is slidable axially of the turbine. The stationary part 3 includes guide vanes 5 forming a nozzle ring; and the axially slidable part 4 has affixed to, or integrated with, its end adjacent the gas passage, guide vanes 6. The driving side of the turbine is enclosed by the housing 7. Adjacent the rotor blading 8 and extending axially therefrom is a gas discharge pipe 9. This pipe 9 collects the gases from the turbine rotor 1 after they have passed through its blading 8; from the pipe 9, the gas is passed into the exhaust pipe 10. To effect the slidable displacement of the sleevelike inlet control device part 4, there is provided an actuating device, shown in Figs. 1, 2 and 3. This actuating device comprises a crank lever 11 keyed to a pin 12, which is journalled in a guide sleeve 13. Upon the lower end of the pin is fastened a cam 14 (Figs. 1 and 3). This cam 14 engages a cut-out portion 15 in the sleevelike part 4. By rotating the crank lever 11, the inlet control device part 4 may be moved to the right or to the left. For example, upon rotating the crank lever 11 to the right (Figs. 2 and 3) the cam 14 connected therewith acts upon the left-hand defining wall of the cut-out portion 15 to force the sleevelike cylinder to the left, thereby withdrawing the inner blading 6 of the slidable inlet control device 4 from the stream of the actuating medium ahead of the rotor blading. Conversely, moving the lever 11 to the left, forces the sleevelike part 4, and hence the blading 6, to the right, so that the blading 6 enters the gas passage just before the blading 8 to throttle the gas stream according to the size, shape and angle of the blading 6, and the extent of its insertion into the gas passage.

To accomplish automatic operation of mechanism 11, 12, 14 according to the blower air pressure in conduit 22, there is provided a pressure actuated device 16a. This device has a piston 16, which is movable in a cylinder 17. Depending on the fluid pressure in the cylinder 17, and upon the thereto opposed pressure of the spring 18, the piston rod 19 is moved in one or the other direction to position, by means of link 20 and crank lever 11, the slidable inlet control device part 4. The design may be such that the same pressure which prevails in the pressure conduit 22 of blower 23 driven by the turbine 1 is introduced through the conduit 21 into the cylinder 17.

Figure 1A:
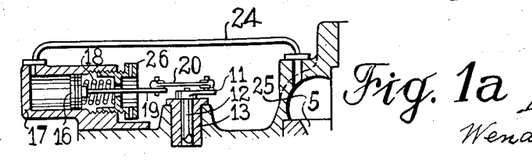
Fig. 1a shows a partial cross-section of a modified construction.

In the arrangement shown in Fig. 1 the setting of the slidable inlet control device part 4 may alternatively be effected by means of the pressure of the actuating gas prevailing in the casing 2. For this purpose there may be provided, in lieu of conduit 21, a conduit 24, as shown in Fig. 1a, connecting the gas receiving space 25 with the cylinder 17.

In the Figs. 2 and 3, the actuating device with its parts 16, 17, 19, 20 and 11 is shown in plan view, in the direction of the arrows in Fig. 1. In Fig. 3 there are additionally shown in broken lines the parts 14 and 15. By means of the adjusting screw 26, the pressure of the spring 18 upon the piston 16 may be changed as desired.

In Fig. 2, two separate ducts 30 and 31 in the casing 2 for the incoming actuating gas are shown, as are also the slidable inlet control device part 4 and the circular blading assembly 6.

In Fig. 3 the slidable inlet control device part 4 is shown partially in section as a cylindrical prolongation of the circular blading assembly 6. Both portions are concentrically disposed, in respect of the turbine axis.

Figure 4:
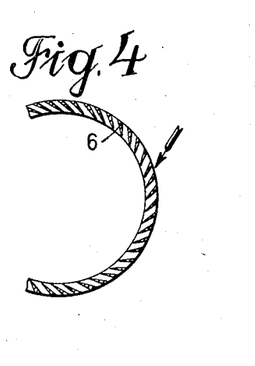
Fig. 4 is a part section along the line IV—IV in Fig. 3.

The assembly of the vanes 6 is shown in Fig. 4. In this design the vanes have straight wall-surfaces, wedge-shaped in cross-section, the thicker portion being on the gas entrance side, and the thinner knife-like portions on the exit side adjacent the turbine rotor 1.

Fig. 5 shows more clearly the gas admission to the turbine. There are two separate ducts 30 and 31. These ducts are separated from each other up to the stationary guide-blades 5 (contained in the stationary guide-blade assembly 3) by means of partitions 34 and 35.

The inner slidable inlet control device part 4 contains guide-blades 6' which are not wedge shaped. As shown in Fig. 5, there are twice as many guide blades or vanes 6' as they are vanes 5. Each exit end of a vane 5 fits upon the entrance edge of each second vane or blade 6', to continue guiding the actuating gas streams into the blading 6'. Separation of the incoming gas streams in the ducts 30 and 31 is thereby maintained through the bladings 5 and 6'. Every other guide vane 6', which does not abut with the exit edge of a blade 5, projects freely into the tangential intermediary space of two adjacent guide vanes 5. The guide vanes 6' in this embodiment are relatively thin and of equal thickness throughout. In Fig. 5 there is also shown in front view the blading 8 of the turbine rotor 1.

The turbine and gas inlet control arrangement illustrated in Figs. 6–11 differs from that of Figs. 1–5 in the following important particulars: in the four gas inlet passages 30', 31', 32 and 33 in the turbine; in the control actuating mechanism which is manually operated; in the ring assembly 3' and 5', and the vanes 6''. The primed numerals otherwise designate parts similar to those designated by corresponding unprimed numerals in Figs. 1–5.

Figures 6, 7:
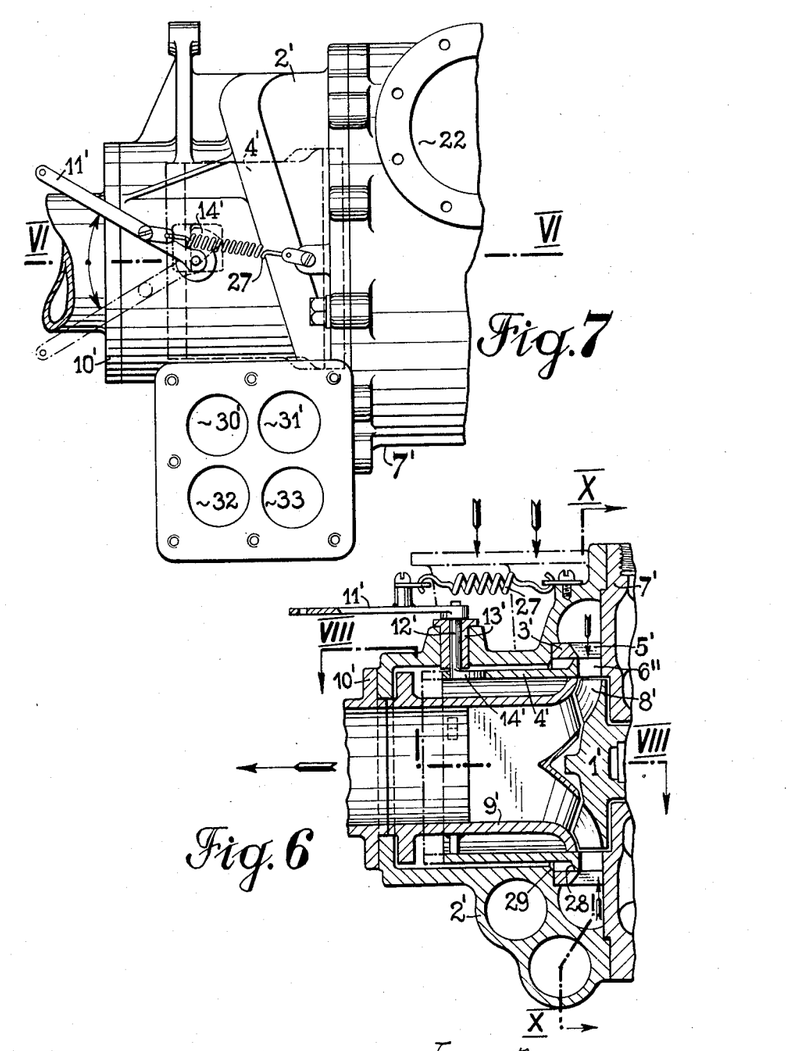
Fig. 6 is a section along the line VI—VI in Fig. 7.
Fig. 7 is a plan view of Fig. 6.
Figure 8:
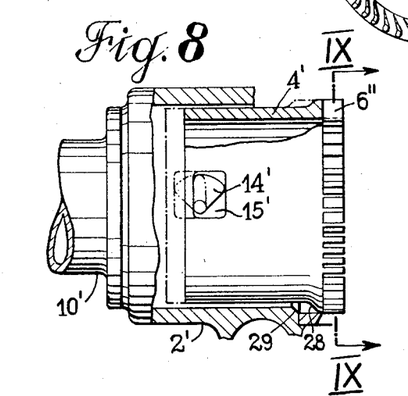
Fig. 8 is a partial elevation and a partial section along the line VIII—VIII in Fig. 6, through an axially slidable guide-device part.
Figure 9:
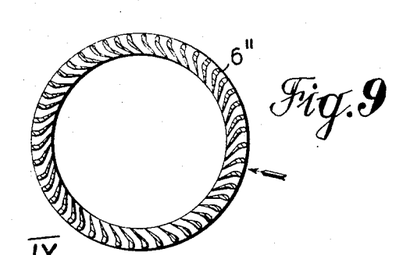
Fig. 9 is a section through the blading of an inner inlet control device part along the line IX—IX in Fig. 8.

In Fig. 6 the slidable inlet control device part 4' is shown in its extreme right hand position at variance to the position in which the corresponding part 4 is disposed in Fig. 1. This setting is accomplished by a device (including a crank lever 11', a pin 12', with the guide sleeve 13' and a cam 14') similar to that shown in Fig. 1. The actuating device in Fig. 6 differs from the corresponding device of Fig. 1, in that the cam 14' is actuated manually by rotation of the crank lever 11'. A spring 27 forces the crank lever 11' into either of its two end positions. One end position, as shown in Fig. 7, corresponds with the right hand setting of the slidable inlet control device part 4'. The thereto corresponding position of the cam 14' is illustrated in Fig. 8. In Fig. 9 a further and different shape of the vanes 6'' is shown. At the entrance end the latter are nearly radially directed, and at the other end, more tangentially directed. In Fig. 8 the end position to the left of the inlet control device part 4' is indicated by dash-dotted lines. At the dash-dotted position of the cam disc 14', the control device part 4' is in its extreme left hand position; it is kept in this position by the spring 27 acting upon the crank lever 11'. The crown 28 on the guide device part 4' abuts the recess 29 on the turbine entrance housing 2'. The end position to the right of the guide device part 4' is determined by abutting of the vanes 6'' against the housing part 7'. This latter position is maintained by the pull of the spring 27 upon the crank lever 11'.

In Fig. 7 the crank lever 11' is shown in plan view. According to the position of the actuating device (indicated in full lines), the inlet control device part 4' (indicated in broken lines) is in its extreme right hand position. When the crank lever 11' is pulled to the other side, shown by dash-dotted lines, the cam 14' is set to the position shown by dash-dotted lines in Fig. 8, which also shows in dash-dotted lines the thereto related position of the slidable inlet control device part 4'. The inner blading 6'' in this case is set axially to the left beyond the outer stationary blading 5'; when the blading 6'' is thus set the actuating gas flows only through the blading 5' on its way to the rotor blading 8', similarly as shown in Fig. 1.

Figure 10:
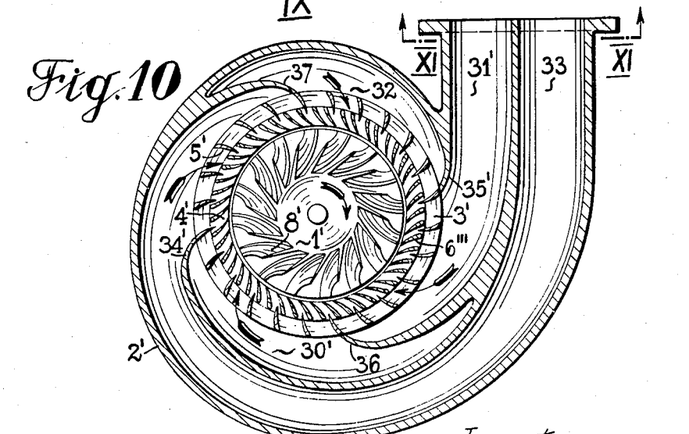
Fig. 10 is a radial section along the line X—X in Fig. 6, showing a modified form of the slidable inlet control device part and its guide blading illustrated in Fig. 6.
Figure 11:
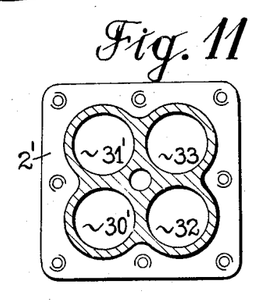
Fig. 11 is a section on the line XI—XI in Fig. 10.

A more detailed illustration of the gas entrance ducts 30', 31', 32 and 33, which are seen in Fig. 7 and which receive the incoming actuating gas, is found in Figs. 10 and 11. The conduit lines 30', 31', 32, and 33 guide the gas to four separate segment type inlets arranged in quadrants formed by four of the outer guide vanes 5'. This separation is established by means of the tongue type partitions 34', 35', 36 and 37. As shown in Fig. 10, the conduits 30', 31', 32 and 33 guide the gas to the quadrants of the guide vanes 5'. Each of the tongue type partitions 34', 35', 36, and 37 fits exactly upon a guide vane of the blading 5' of the nozzle ring assembly 3'. By this arrangement of four quadrants of the inlet control device parts 3' and 4' the four gas streams are kept apart up to the exit end of the vanes 5' or further, of the vanes 6''', when the latter are inserted in the gas passage preceding the turbine blading 8'.

In the embodiment according to Fig. 10, there is shown a different type of guide vane 6''' as compared to the ones which are shown in Figs. 5 or 9. Thus, the vanes 6''' project into the space between the vanes 5', so that the actuating gas, before leaving the blading 5', has already entered the blading 6'''. The streamlined curved shape of the vanes 6''' will be seen in the cross-section thereof. The rotor blading 8' of the turbine is shown in front view.

Figure 12:
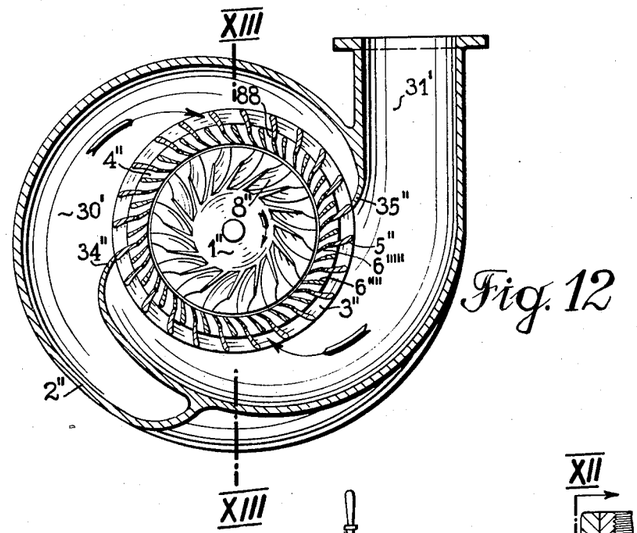
Fig. 12 is a radial section along the line XII—XII in Fig. 13.
Figure 13:
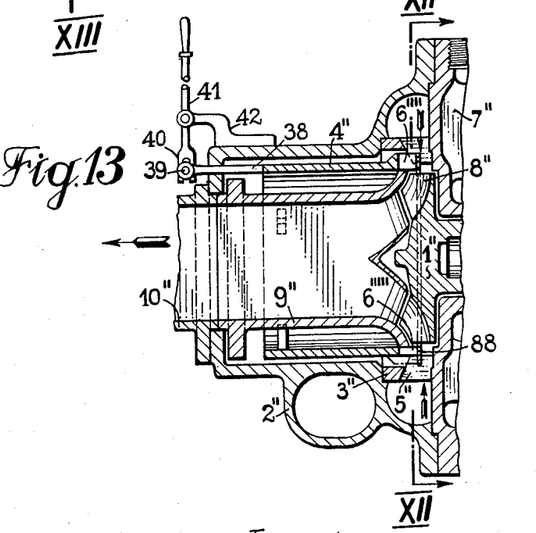
Fig. 13 is a vertical section along the line XIII—XIII in Fig. 12.

Compared to the designs illustrated in Figs 1 and 5, the main difference in the structure of the turbine of Figs. 12 and 13 resides in the presence in the latter turbine of blading slidable relative to the stationary blading which slidable blading projects at least partially in-between the stationary blading. Furthermore, there is shown another form of an actuating mechanism to displace the slidable inlet control device part into various positions which mechanism is operable by hand, or foot or other means. Thus, in lieu of the cam-cut out actuating device previously described in the embodiment of Figs. 12 and 13, I provide an extension 38 to effect the slidable displacement of the inlet control device part 4''. At the extremity of this extension, I further provide a pin 39, which occupies the space between the prongs of a fork 40 of the lever 41. The lever 41 is pivotally supported at 42 on the turbine entrance casing 2'' and can be actuated by means of the link rod 43. Actuation may be effected by various means, such as by hand or foot or by means of a servo-motor, as shown in Fig. 1.

Another guide blading arrangement is illustrated in Fig. 12. Here the actuating gas enters via two separate ducts 30'' and 31'', the front of the guide vanes 5'' of the inlet control device part 3''. The ducts 30'' and 31'' are maintained separate by partitions 34'' and 35'', and, in each case, additionally by guide vanes 5''. The actuating gas is thereby divided into two separate streams, each flowing through one half of the blading of the nozzle ring assembly 3''. The inner slidable guide device part 4'' contains two different types of vanes, 6'''' and 6'''''. The vanes 6'''' are radially longer than the vanes 6'''''. The vanes 6'''' protrude into the spaces between vanes 5'', while the shorter vanes 6''''' are only so long and so disposed that they abut the inner ends of every other vane 5'' and maintain thereby the gas streams continuously separate at such points of transition. The blading 8'' of the turbine rotor 1'' is shown (Fig. 12) in front elevation. The vanes 6'''' and 6''''' may be provided at their otherwise free front end with a lateral cover plate 88 (Fig. 13).

Figure 14:
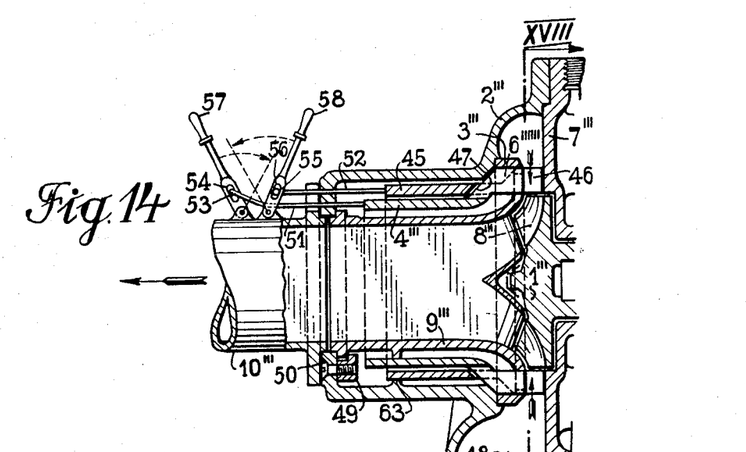
Fig. 14 is an axial section along the line XIV—XIV in Fig. 18.

Figs. 14–18 show further embodiments, in which there are provided two axially slidable inlet control device parts which contain differently formed guide-vanes. The actuating medium is led to the turbine wheel through a one part spiral casing. In this case, there is arranged outside of the slidable inlet control part 4''', a second axially slidable sleevelike inlet control device part 45, carrying a circular blading assembly 46. In this embodiment, the stationary ring 3''' serves to guide the inlet control device parts 4''' and 45 at their outer circumferences, and also at the outer edges of the vanes 6''''''. This ring 3''' is fastened to the gas entrance casing 2''', and contains no stationary guide vanes in contrast with the turbine arrangements shown in Figs. 1–13. The inlet control device part 4''', as shown in Fig. 14, is shown disposed in its left hand end-position, where it abuts against the conical edge 47 of the gas entrance casing 2'''. This inlet control device part 4''' can also be moved to the right. When part 4''' is set to the left as thus shown in Fig. 14, the guide vanes 6'''''', which are fastened thereto are completely withdrawn from the zone through which the actuating gas stream enters the turbine wheel blading 8'''. The outer inlet control device part 45 is shown in Fig. 14, disposed in its right hand end-position. In such position of part 45, the vanes 46 secured to the guide device part 45, abut against the casing part 7'''. In these settings of 4''' and 45, the actuating gas arriving from duct passage 48 within the casing 2''' passes only through the guide vanes 46 before it enters the blading 8''' of the turbine rotor 1'''.

In Fig. 14, 9''' is the gas discharge conduit, which receives the exhaust gases after the turbine, and 10''' is the thereto attached gas exhaust pipe. The stationary ring 3''' is preferably independent from the conduit 9''', though it could be formed integrally with it. The pipe 9''' is secured to the turbine casing 2''' by means of adjustable flange fittings 49 and screw bolts 50.

Link rods 51 and 52 are attached on the slidable inlet control device parts 4''' and 45. These rods contain heads 53 and 55, which are placed in slots 54 and 56 of the hand levers 57 and 58. By oscillating the hand levers 57 and 58 to the right or to the left, the two guide device parts 4''' and 45 can be similarly moved singly either to the right or to the left, as may be seen from the illustration in Fig. 14.

Figure 15:
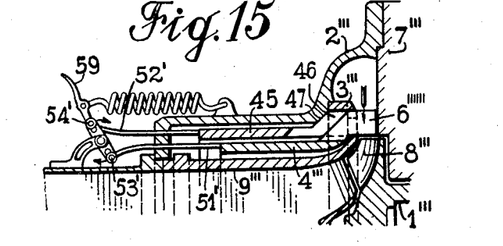
Fig. 15 is a modification of Fig. 14, in which the two inlet control device parts are differently related to each other.

When the modification of the actuating mechanism shown in Fig. 15, is employed, one inlet control device part (e. g., 4''') may be moved to the right, when the other part 45 is simultaneously moved to the left. Only one actuating lever 59 is thus necessary for this type of actuating device which may be adapted by a pedal for foot operation as shown in Fig. 15. Depending upon the settings of the lever or pedal 59, the linkrods 51, 52, and therewith also the inlet control device parts 4''' and 45 are moved simultaneously in opposite directions. This effect results from the fact that the positions of the pins 53', 54', which are fulcrumed in the rod-ends 51' and 52', are moved in opposite directions, when the pedal 59 is actuated. In Fig. 15, the guide blading 6'''''' is shown in the passage of the actuating gas stream, while the guide blading 46 is withdrawn therefrom, notably at variance with the conditions illustrated in Fig. 14.

Figure 16:
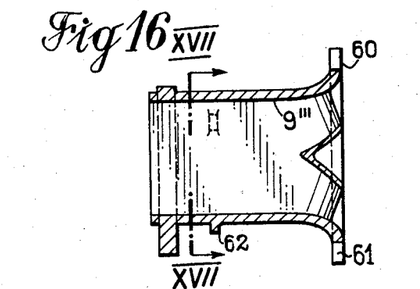
Fig. 16 is an axial section of the inner exhaust pipe of the turbine.
Figure 17:
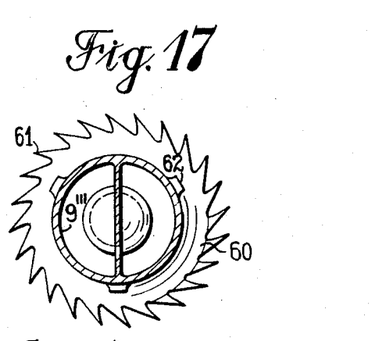
Fig. 17 is a section along the line XVII—XVII in Fig. 16.

Fig. 16 shows more clearly the exhaust conduit 9''' which, in Figh. 14 and 15, is situated directly behind the turbine. This conduit 9''' contains a flange or crown 60 on its end nearest the turbine blading. The outside of this flange is formed with serrations 61 and open spaces between them. This configuration permits the guide vanes 6'''''' and 46 to pass through the flange 60 (Fig. 17) and serves to guide these vanes during their axial sliding displacement. On the outside of the conduit 9''' are projections or bosses 62 (Figs. 16, 17), which permit the guiding of the sliding movement of the inlet control device part 4''' upon the exhaust pipe 9'''. In another design shown in Fig. 14, guide bosses 63 are disposed inside of the turbine entrance casing 2'''. The bosses 63 guide the slidable inlet control device part 45 centrally in respect to the axis of the turbine. However, as previously pointed out, guidance of both slidable inlet control device parts 4''' and 45 is also accomplished by the ring 3'''. A design according to Figs. 16 and 17 also serves the purpose of at least partly sealing the space around the vanes 6'''''' and 46 against leakage of actuating gas, by means of the flange 60, which may be part of the exhaust pipe 9'''.

Figure 18:
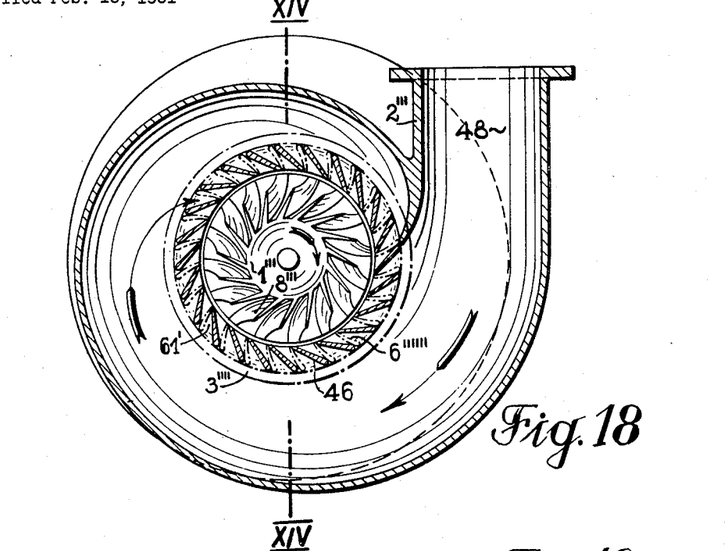
Fig. 18 illustrates in a radial section along the line XVIII—XVIII in Fig. 14 the spiral casing of the turbine and the inlet control device parts. The thereto appertaining rotor blading is illustrated in front elevational view.

In Fig. 18 the turbine entrance casing 2''' and the vanes 6'''''' and 46 of the two slidable inlet control device parts are shown in a section along a plane normal to the axis of the turbine. When the vanes 6'''''', shown in dash-dotted lines, are inserted alone into the actuating gas passage ahead of the turbine rotor 1''', the throughflow passage for the actuating gas is relatively great; and if only the blades 46 are inserted into the passage of the actuating gas, as shown in solid lines in Fig. 18, then smaller actuating gas entrance openings will be established. If both types of guide vanes are inserted into the actuating gas passage, practically no gas flows into the turbine wheel. Fig 18 also shows the turbine wheel 1''' and its blading 8''' in front view.

Figures 19, 20:
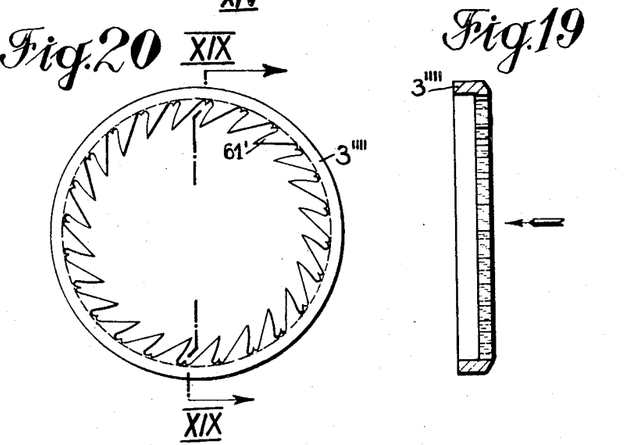
Fig. 19 shows a section of a stationary guide ring for the slidable inlet control device parts along the line XIX—XIX of Fig. 20.
Fig. 20 is a side view in direction of the arrow shown in Fig. 19.

Figs. 19 and 20 show a stationary guide ring 3'''' which, at its inner circumference, is provided with serrations 61'. This modified ring structure may be adapted to guide the slidable vanes 6'''''' and 46 through the stationary guide ring 3'''' (at variance with the structure shown in Figs. 16 and 17) and also to seal the slidable inlet control device parts around their area of entry into the actuating gas passage ahead of the turbine rotor.

Figure 21:
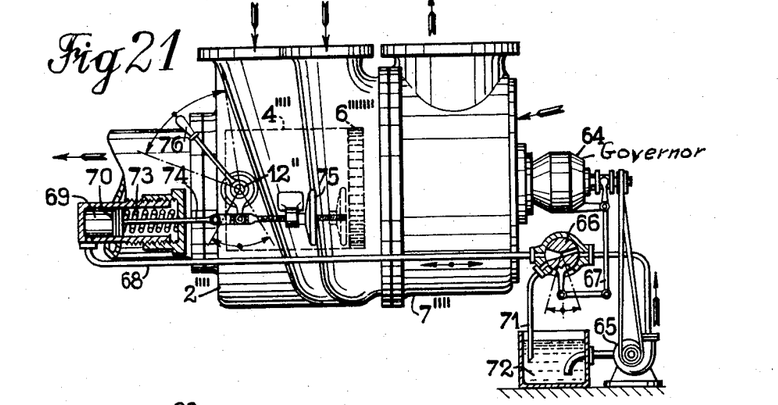
Fig. 21 shows in partial section and in partial elevation another design of an actuating device for a slidable inlet control device part.

In Fig. 21 the displacement of the slidable inlet control device part is accomplished by means of a governor influenced by the turbine itself, using oil pressure control and a servo-motor. 2'''' designates the entrance casing of a gas turbine and 7'''' the casing of a machine, which is driven by the gas turbine. A slidable guide device part 4'''', which contains a guide blading assembly 6'''''' is built into the gas turbine. By rotation of the pin 12'', the inlet control device part 4'''' can be axially displaced, similarly as has been shown in the Figs. 1–9. The blading 6''''''' may thus be moved to a selected degree into the actuating gas passage, which communicates with the blading of the turbine wheel. In this embodiment, rotation of the pin 12'' is effected by a governor or regulator 64, which is driven by the gas turbine. The various settings of this governor are communicated to the adjusting pin 12'' by means of servo-motor control which is well-known in the art. The pressure oil for this control is delivered by the pump 65; this pump is also driven by the turbine shaft. The pressure oil overflow valve 66 is controlled by means of leverage 67 according to the setting of the governor 64. By this arrangement, the pressure oil is either conducted through the pipe line 68 into the cylinder 69 of the servo-motor to press the piston 70 to the right, whereby the inlet control device part 4'''' with its blading 6''''''' is moved into the passage of the actuating gas entering the turbine rotor; or else the pressure oil is returned over the valve 66 through the return pipe 71 to the oil reservoir 72 of the pump 65. When this latter action occurs, the piston 70 is unloaded, and biased to the left by the spring 73. The inlet control device part 4'''' is then also moved to the left by the piston rod 74, and this, in turn, draws the blading 6''''''' out of the actuating gas passage. The servo-motor 70, 74 can also be fitted with an actuating device 75. There may also be provided a hand lever 76 keyed to the pin 12''.

Figure 22:
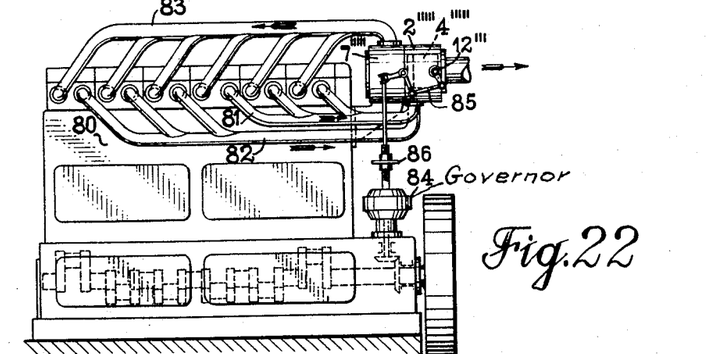
Fig. 22 illustrates schematically a complete turbocharged internal combustion engine system operating according to my invention. In this embodiment is shown a design of an actuating device for the slidable inlet control device parts which the governor of the engine is also used to adjust.

In Fig. 22, 80 designates an internal combustion engine, which supplies its exhaust gases through manifold exhaust pipes 81 and 82 to a gas turbine 2'''''. This turbine 2''''' is constructed with any of the several types of inlet control device illustrated and described in this application, but I prefer to employ the arrangement shown in Figs. 6–10. A charging air blower 7''''' is driven by the gas turbine 2'''''. Compressed air from the blower is fed over the intake manifold piping 83 to the cylinders of the internal combustion engine. The engine 80 includes a governor 84, which is adjustable and may be set in accordance with the power delivered by the engine. In this embodiment of my invention, the settings of the governor are also used to position the inlet control device part 4''''' of the exhaust gas turbine 2'''''. Displacement of the inlet control device part 4''''' may be accomplished by rotation of the pin 12''', as for example, is described in connection with Figs. 1–9. The settings of the engine governor 84 are communicated by means of linkage 85 to the pin 12''' in any suitable manner. The governor 84 may also perform other functions such as regulating the fuel supply to the engine. In addition, a hand operated device 86 may also be provided to change, for example, the speed or R. P. M. range of the internal combustion engine as well as to adjust the inlet control device.

The embodiments of my invention described above are illustrative only. With an understanding of my invention and its importance, other means for varying the through flow area, shape and direction of the gas stream directed at the turbine blading will readily occur to those skilled in the art. Obviously, it may also be used to advantage in gas turbine and turbojet engines. All these variants and applications I intend to comprehend within the scope of my invention.

I claim:

1. A turbine having a rotor adapted to rotate in one rotational direction with blading to receive motive fluid directed at least parially radially against said blading and a casing enclosing said rotor within which casing is included duct means providing at least one inlet passage via which motive fluid is conducted from a source outside the casing into an annular space directed at least partially radially toward the blading of said rotor, said annular space being laterally orificed in the vicinity of the entrance edges of said blading, a stationary guide vane assembly rigidly secured to the turbine casing having vanes which fixedly span the fluid passage radially beyond the orificed area of the annular space, a sleevelike element slidable axially, said element being provided at its extremity nearest the orificed area of the duct means with vanes adapted to pass through said orificed area and into the fluid passage, and means operably connected to said slidable element to effect the insertion and withdrawal of the vanes through said orificed area and into and out of said duct means between the stationary vanes and said rotor blading to any desired extent by slidably displacing said element axially, said last named vanes extending in the same general direction as the vanes of said stationary guide vane assembly, maintaining the same rotational direction of the rotor and successively reducing the through flow area between said stationary vanes to thereby provide for optimal efficiency of the turbine at a smaller available quantity of motive fluid and wherein the width, taken radially of the turbine axis, of at least some of the vanes on the slidable element and their disposition as respects the stationary blades is such that at least some parts of said vanes on the slidable element project into the space between some of the guide vanes of the stationary guide vane assembly.

2. A turbine having a rotor adapted to rotate in one rotational direction with blading to receive motive fluid directed at least partially radially against said blading and a casing enclosing said rotor within which casing is included duct means providing at least one separate inlet passage via which motive fluid is conducted from a source outside the casing to the rotor blading, said duct means terminating in an annular space disposed at least partially radially outside of the rotor blading whereby said fluid may be directed at least partially radially toward the said blading, the annular terminating portion of said duct means further being laterally orificed in the vicinity of the entrance edges of said blading, a conduit coaxial with the rotor and adapted to lead the motive fluid away axially from the rotor upon its discharge from the rotor blading, an annular stationary guide vane assembly rigidly secured to the turbine casing and forming a part of the terminating portion of the duct means defining said annular space having vanes fixedly spanning the annular space and being disposed at least as far radially outwardly in said duct means as to clear the orificed area therein, a sleevelike element slidable axially along said conduit, said element being provided at its extremity nearest the orificed area of the duct means with vanes adapted to pass through said orificed area and into the annular space, and means operably connected to said slidable element to effect the insertion and withdrawal of the vanes through said orificed area into and out of said duct means to any desired extent by slidably displacing said element in relation to said conduct, said last named vanes extending in the same general direction as the vanes of said stationary guide vane assembly maintaining the same rotational direction of the rotor and successively reducing the through flow area between said stationary vanes to thereby provide for optimal efficiency of the turbine at a smaller available quantity of motive fluid.

3. A radial turbine having a bladed rotor and a casing enclosing said rotor within which casing is included duct means providing an inlet passage via which motive fluid is conducted from a source outside the casing up to, and directed radially toward the gas entrance of all the blading of said rotor, said duct means having a stationary guide vane assembly in the portion of said duct means leading up to the rotor blading for rotation of the rotor in one direction, said guide vane assembly being constructed for optimal efficiency of the turbine at predetermined quantities and temperatures of the motive fluid, and a second movable guide vane assembly for rotation of the rotor in said same direction, said movable guide vane assembly being slidable axially for insertion and withdrawal in and out of said duct means between said stationary guide vane assembly and the entrance edge of the rotor blading, said second guide vane assembly being constructed for optimal efficiency of the turbine at smaller quantities of motive fluid than those for which said first guide vane assembly is constructed.

4. A turbine having a rotor with blading adapted to receive motive fluid directed at least partially radially against said blading and a casing enclosing said rotor within which casing is encluded duct means providing at least one inlet passage via which motive fluid is conducted from a source outside the casing up to, and directed at least partially radially toward the blading of said rotor, said duct means being laterally orificed in the vicinity of the entrance edges of said blading, an inlet control device adapted to change the through flow area and shape of said passage as it approaches the entrance edges of the rotor blading, and to change the direction of said passage with respect to the rotor blading, said inlet control device comprising a stationary guide vane assembly rigidly secured to the turbine casing, the vanes of which assembly fixedly span the fluid passage radially beyond the orificed area of the duct means, a sleevelike element slidable axially, said element being provided at its extremity nearest the orificed area of the duct means with vanes adapted to pass through said orificed area and into the fluid passage, the last said vanes being of different through-flow characteristics as respects the form, direction and section of the through-flow passages therebetween from the corresponding characteristics of the vanes of the stationary guide vane assembly, and means to effect the insertion of the vanes on the slidable element through said orificed area and into said passage between the stationary vanes and the turbine rotor blading to any desired extent by slidably displacing said element axially, whereby the velocity and direction of the motive fluid in said passage as the fluid is projected therefrom onto the rotor blading, may be varied as desired depending upon the volume, temperature and pressure of said fluid arriving from the source thereof, the width, taken radially of the turbine axis, of at least some of the vanes on the slidable element and their disposition as respects the stationary blades is such that at least some parts of said vanes on the slidable element project into the space between some of the guide vanes of the stationary guide vane assembly.

References Cited in the file of this patent

UNITED STATES PATENTS

| | | |
|---|---|---|
| 341,577 | Holmes | May 11, 1886 |
| 746,061 | Fullagar | Dec. 8, 1903 |
| 1,551,337 | Siegler | Aug. 25, 1925 |
| 1,856,024 | Büchi | Apr. 26, 1932 |
| 2,198,679 | Radelet et al. | Apr. 30, 1940 |
| 2,199,259 | Hersey | Apr. 30, 1940 |
| 2,390,506 | Büchi | Dec. 11, 1945 |
| 2,412,365 | Sollinger | Dec. 10, 1946 |
| 2,421,445 | Waller | June 3, 1947 |
| 2,560,210 | Browne | July 10, 1951 |
| 2,581,600 | Pateras Pascara | Jan. 8, 1952 |
| 2,622,391 | Lindeman | Dec. 23, 1952 |

FOREIGN PATENTS

| | | |
|---|---|---|
| 242,429 | Switzerland | Dec. 16, 1946 |